United States Patent Office 3,585,044
Patented June 15, 1971

3,585,044
LICORICE-CONTAINING CITRUS JUICE BEVERAGE
Dale H. Koski and Joan B. Koski, both of P.O. Box 14100, Benjamin Franklin Station, Washington, D.C. 20044
No Drawing. Filed Feb. 12, 1968, Ser. No. 704,560
Int. Cl. A23l 1/02
U.S. Cl. 99—28                                7 Claims

ABSTRACT OF THE DISCLOSURE

A palatable licorice-containing citrus juice beverage is produced by a series of steps which comprise admixing licorice root and water, bringing the admixture to a boil with the addition of sugar for a period of time sufficient to result in a palatable, final beverage, and admixing the licorice-containing admixture with citrus juice.

---

This invention relates to a method for the production of a licorice-containing citrus fruit beverage and to the beverage produced by such process. More particularly, this invention relates to a licorice-containing beverage comprising orange and lemon juices.

Licorice is a naturally-occurring material that has found wide commercial usage. Licorice contains 6–14 percent glycyrrhizin, which is the glucoside of glycyrrhizic acid, asparagin, sugars and resin. The licorice root contains glycyrrhiza as the mixed calcium and potassium salts of glycyrrhizic acid. The term "glycyrrhizin" is taken from the Greek word "glycyrrhiza" based upon the term "glykys" meaning sweet and "rhyza" meaning root. Glycyrrhizin has a sweetness many times that of sucrose and the black extract made from the dried root of the licorice plant has found usage, for example, as a flavoring agent in medicine. However, the characteristic flavor of licorice has apparently prevented its usage in various beverages because it is generally incompatible, tastewise, with beverages such as citrus juices.

Accordingly, it is an object of this invention to provide a novel licorice-containing beverage.

It is another object of this invention to provide a palatable licorice-containing citrus fruit beverages having a taste unlike that of the licorice or citrus fruit alone.

It is a further object of the invention to provide a method for the production of a licorice-containing citrus fruit beverage.

It is still another object of the present invention to provide a method for the production of a licorice containing citrus fruit beverage having a pleasant taste and appearance.

These and other objects are achieved in accordance with the present invention wherein a method for the production of a licorice-containing citrus fruit beverage is provided, which method comprises forming an admixture of licorice and water, heating the admixture to its boiling point, adding a relatively small amount of sugar (sucrose) to the admixture at the first indication of ebullition, boiling the admixture for a period of time sufficient to result in a palatable product, e.g., between about 1 and about 3 minutes in a substantially closed system, discontinuing the addition of heat while the system is still substantially closed, and after steeping the mixture for a relatively short period of time, e.g. between about 1 and about 3 minutes admixing the licorice-containing admixture with citrus juice.

Surprisingly, the process of the present invention provides a highly palatable licorice-containing fruit juice beverage. Furthermore, the present method results in a frothy fruit juice beverage that has a fresh, natural appearance.

The aeration of fruit juices has been suggested for the purpose of improving its taste. For example, manufacturers or packers of concentrated juices have suggested that the concentrate be poured back and forth from one vessel to another after the specified quantity of water is added so as to aerate the beverage and give it a fresh, natural taste. Although it is not intended to limit the present invention to any particular theory, the fresh, natural appearance and good taste of the beverage of the present invention may be due to the fact that the glycyrrhia or some other constituent of the licorice acts as sort of a foaming agent so as to entrap air bubbles in the fruit juice thereby providing a frothy appearance and a pleasant taste.

The initial step of the present method comprises the formation of an admixture of licorice and tap or preferably, distilled water. Any suitable source of licorice may be employed, however, it is preferred to utilize the natural licorice root, per se as the licorice source. The licorice root is preferably reduced to a pelleted form by any suitable means prior to its admixture with water. However, licorice in powder form may also be suitably employed. Suitably, 20 to 30 parts by weight of licorice are admixed with 50 to 70 parts by weight water and the admixture is heated to its boiling point. Next, sugar (sucrose) in an amount of between about 8 and about 35 parts by weight is added to the licorice-water admixture at essentially the first sign of ebullition. Sucrose is preferred, however, sugar-substitutes may be employed if desired, e.g. saccharin and the like.

The admixture comprising licorice, water and sugar is boiled in a substantially closed system for a period of time sufficient to result in a palatable beverage when the licorice-containing admixture is finally mixed with citrus juice. The boiling time period may vary depending upon the exact amounts of the various materials that are employed. A suitable time period includes between about one and about three minutes, preferably two minutes. Following the boiling period, the heating of the mixture is discontinued and the admixture is allowed to steep with the system still substantially closed for a relatively short period of time, e.g. between about one and about three minutes. Preferably, the boiling time and the steeping time are approximately equal in length. Finally, the licorice-containing admixture is combined with citrus juice, e.g. a mixture of orange and lemon juices.

The preferred citrus juice admixture of the present invention comprises between about 90 and about 150 parts by weight orange juice and between about 30 and about 50 parts by weight lemon juice. Preferably, the citrus juice admixture comprises about 120 parts by weight of orange juice and about 40 parts by weight of lemon juice. Either fresh or concentrated juices may be suitably employed. However, it is preferred that the juices be strained through a suitable filtering means, e.g. steel strainer, to remove a substantial portion of solids prior to admixing the citrus juice with the licorice-containing admixture. However, it is not essential to remove a large portion of these materials.

The licorice-containing admixture and the citrus juices are combined in any suitable manner. For example, an agitated vessel such as a stirred tank may be employed under ambient temperature and pressure conditions.

The resulting beverage may be dehydrated so as to form a concentrate for packaging and preservation purposes and later reconstituted with water. The resulting admixture may also be frozen and packaged in the form of a sherbet. The beverage product of the present invention may be employed as a juice drink or may be utilized, for example, as a mix for alcoholic beverages.

The method of the present invention will be further illustrated by the following non-limiting examples.

EXAMPLE 1

Two and one-half ounces (avoir.) of pelleted licorice root are added to three-fourths or (6 fluid ounces) of a cup of water and the mixture is heated to its boiling point. At the first sign of ebullition or boiling, two level teaspoons of granulated sugar (sucrose) are added to the vessel containing the boiling admixture of licorice and water. A suitable closure means, i.e., a lid is placed on the vessel and the contents of the vessel are maintained under boiling conditions for a period of 2 minutes.

Next, the vessel is removed from the heat and the contents are allowed to steep for a period of 2 minutes. The contents of the vessel are then filtered through a fine screen, and admixed with one and one-half (1½) cups, i.e., 12 fluid ounces, of orange juice and one-half (½) cup, i.e. four fluid ounces, of lemon juice. This admixture of the citrus juices with the licorice-containing admixture is conducted at ordinary room temperature, i.e. 75 to 78° F.

The resulting beverage is cooled to below room temperature. It has a very pleasant taste and is honey beige in color with a creamy froth appearing on top.

EXAMPLE 2

The procedure of Example 1 is repeated with the exception that the licorice-water-sugar admixture is boiled for only a period of thirty (30) seconds.

The boiled and steeped licorice-containing mixture is combined with the citrus juices as before. The final beverage has a very poor flavor and is deemed unpalatable.

EXAMPLE 3

The procedure of Example 1 is repeated, except that the licorice-water-sugar admixture is boiled for a period of five minutes. The boiled admixture is combined with the citrus juices as before.

The final beverage has a very unpleasant taste, odor and a poor appearance.

EXAMPLE 4

The procedure of Example 1 is once again repeated except that the boiling time is further increased to six minutes.

The licorice-containing admixture is combined with the citrus juices as before and a sample is tasted. The resulting beverage has an extremely bad taste and odor.

EXAMPLE 5

The procedure of the foregoing examples is repeated except that the licorice-water-sugar boiling time is two and one-half minutes.

The resulting beverage has a very pleasing taste and pleasant appearance.

The foregoing examples illustrate, by comparison, that a good tasting, pleasant appearing licorice-containing citrus juice beverage can be produced by the method of the present invention. Further, these examples illustrate that the boiling time for the licorice-water-sugar admixture must be for a time only sufficient to result in a palatable beverage when the licorice admixture is combined with the citrus juices. The proper boiling time may be easily determined experimentally.

Various modifications may be made within the spirit and scope of the present invention. For example, preservatives may be added to the beverage, e.g. sodium benzoate. The source of water for the admixture with licorice may be ordinary tap water or distilled water. However, distilled water is preferred. The term "substantially closed system" as employed herein is intended to include a vessel having a closure means thereon, e.g., a lid, which does not completely seal the vessel.

Obviously, many modifications and variations of the invention as hereinabove set forth can be made without departing from the spirit and scope thereof; and therefor only said limitations should be imposed as indicated in the appended claims.

We claim:

1. A method for the production of a licorice-containing citrus juice beverage which comprises forming an admixture of licorice root and water, heating said admixture to its boiling point, adding a small amount of sugar to said admixture at essentially the first indication of ebullition, boiling said admixture in a substantially closed system for between about 1 and about 3 minutes, discontinuing the addition of heat to the admixture while the system is still substantially closed, filtering said admixture, and after a short time admixing the resulting filtrate with a citrus juice.

2. The method of claim 1 wherein the boiling of said admixture is for about 2 minutes.

3. The method of claim 1 wherein the admixture is combined with the citrus juice within a period of time of between about 1 and about 3 minutes after the heating is discontinued.

4. The method of claim 1 wherein said admixture to be heated contains between about 20 and about 30 parts by weight of licorice root and between about 50 and about 70 parts by weight of water.

5. The method of claim 1 wherein about 25 parts by weight of licorice root and about 50 parts by weight of water are contained in said admixture to be heated, about 16.5 parts by weight of sugar are employed, and said citrus juice comprises about 120 parts by weight of orange juice and about 40 parts by weight of lemon juice.

6. The method of claim 1 wherein said citrus juice comprises orange juice.

7. A beverage obtained according to the process of claim 1.

References Cited

FOREIGN PATENTS 717,494    9/1965    Canada _____ 99—78

OTHER REFERENCES

Home Made Beverages, Hopkins, 1919, page 42.
Chemicals Used in Food Processing, National Academy of Sciences, 1965, page 237.

MORRIS O. WOLK, Primary Examiner

S. B. DAVIS, Assistant Examiner

U.S. Cl. X.R.

99—105, 140